(12) United States Patent  
Moore

(10) Patent No.: US 6,173,983 B1  
(45) Date of Patent: Jan. 16, 2001

(54) MOTORCYCLE FOOTREST BRACKETS

(76) Inventor: Thomas L. Moore, 1006 Williams, Richland, WA (US) 99352

( * ) Notice: Under 35 U.S.C. 154(b), the term of this patent shall be extended for 0 days.

(21) Appl. No.: 09/264,454

(22) Filed: Mar. 8, 1999

(51) Int. Cl.[7] .................................................. B62J 25/00
(52) U.S. Cl. ............................................. 280/291; 74/564
(58) Field of Search ..................... 280/291, 75; 74/564; 297/423.18, 423.39, 423.4; 296/75

(56) References Cited

U.S. PATENT DOCUMENTS

| D. 231,971 | 7/1974 | Humlong | D8/233 |
|---|---|---|---|
| D. 317,143 | 5/1991 | Weissenberger | D12/120 |
| D. 376,776 | 12/1996 | Gotschi et al. | D12/120 |
| D. 400,827 | 11/1998 | Moore | D12/120 |
| 578,335 | * 3/1897 | Hughes | 280/291 |
| 2,454,842 | 11/1948 | Schofield et al. | 280/301 |
| 4,456,090 | * 6/1984 | Malenotti | 180/219 |
| 4,779,481 | * 10/1988 | Natzke et al. | 74/512 |
| 5,779,254 | 7/1998 | James et al. | 280/291 |

FOREIGN PATENT DOCUMENTS

| 484952 | * 10/1929 | (DE) | 280/291 |
|---|---|---|---|
| 662018 | * 8/1929 | (FR) | 280/291 |
| 223326 | * 10/1924 | (GB) | 280/291 |

* cited by examiner

*Primary Examiner*—Anne Marie Boehler  
(74) *Attorney, Agent, or Firm*—Wells, St. John, Roberts, Gregory & Matkin

(57) ABSTRACT

Motorcycle footrest brackets are described and that are adapted to be secured on opposite sides of a motorcycle having a frame and passenger footrest mounting holes on opposed sides of the frame. Each of the brackets includes a rigid base plate including a bottom end and an upward end. A bolt is mountable to each base plate at the bottom end and is configured for attachment to one of the passenger footrest mounting holes on the motorcycle. A pin on each of the base plates extends to an inward end and is positioned on the base plate and configured to abut with a portion of the motorcycle frame to prevent rotation of the base plate about the bolt. A footrest mount on each rigid base plate adjacent its upward end is configured to mount a conventional motorcycle footrest.

13 Claims, 5 Drawing Sheets

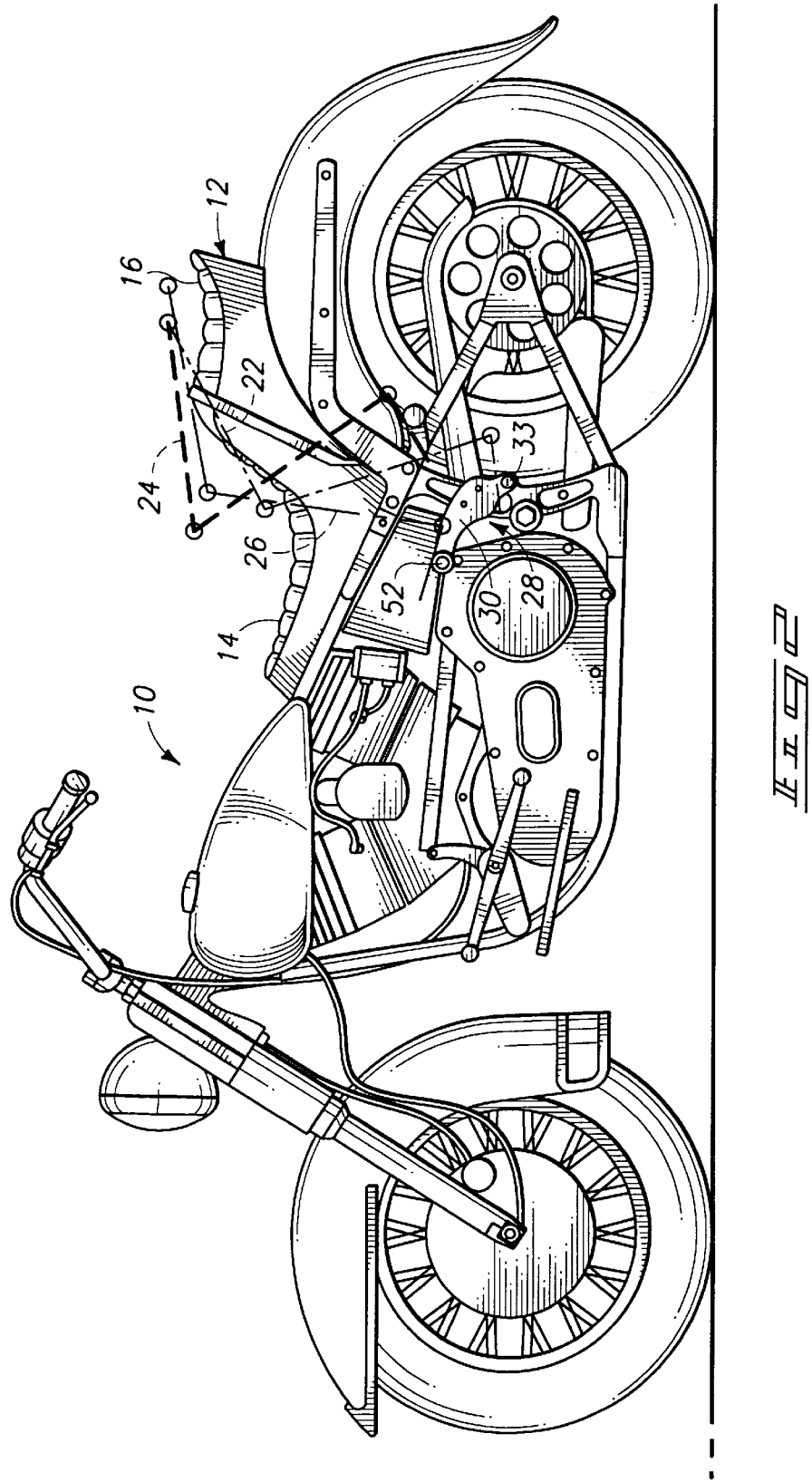

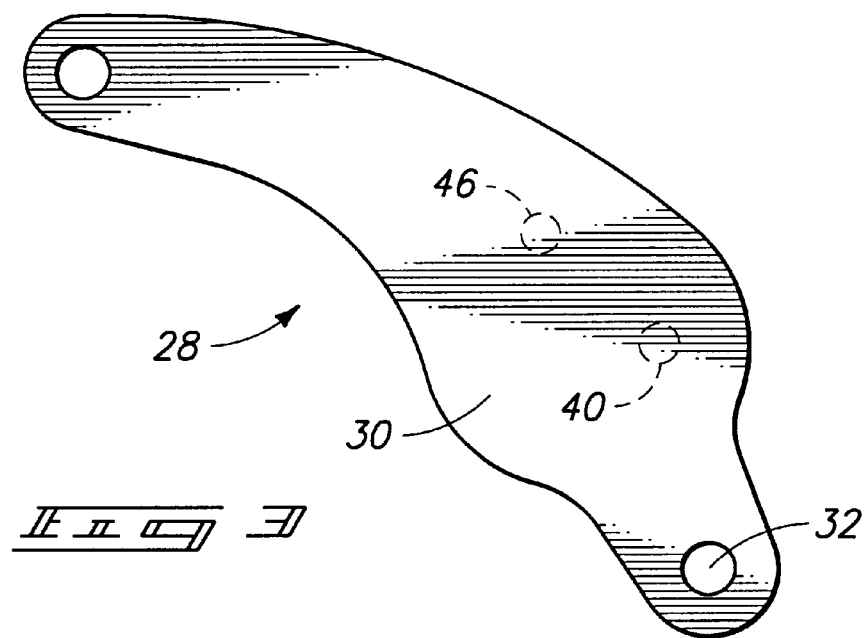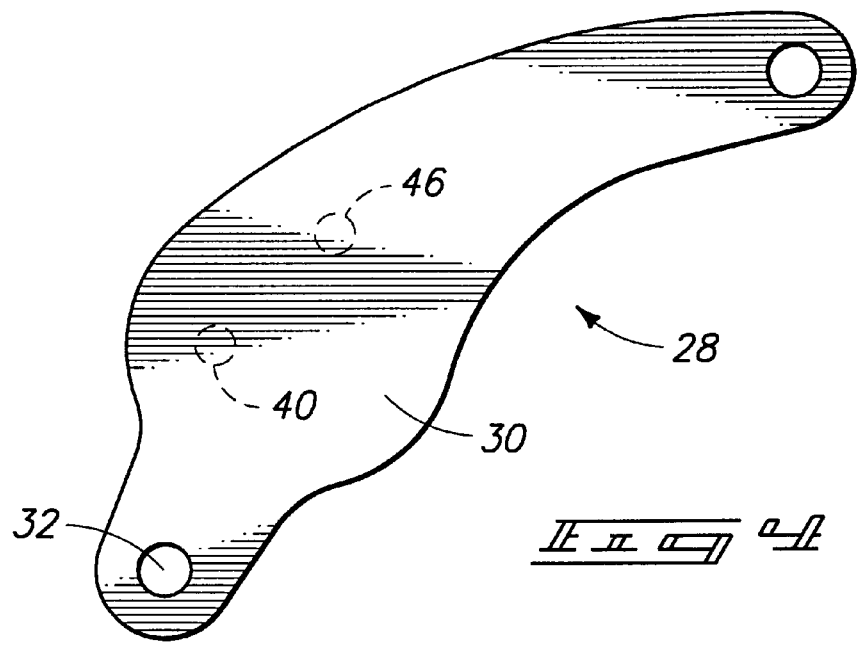

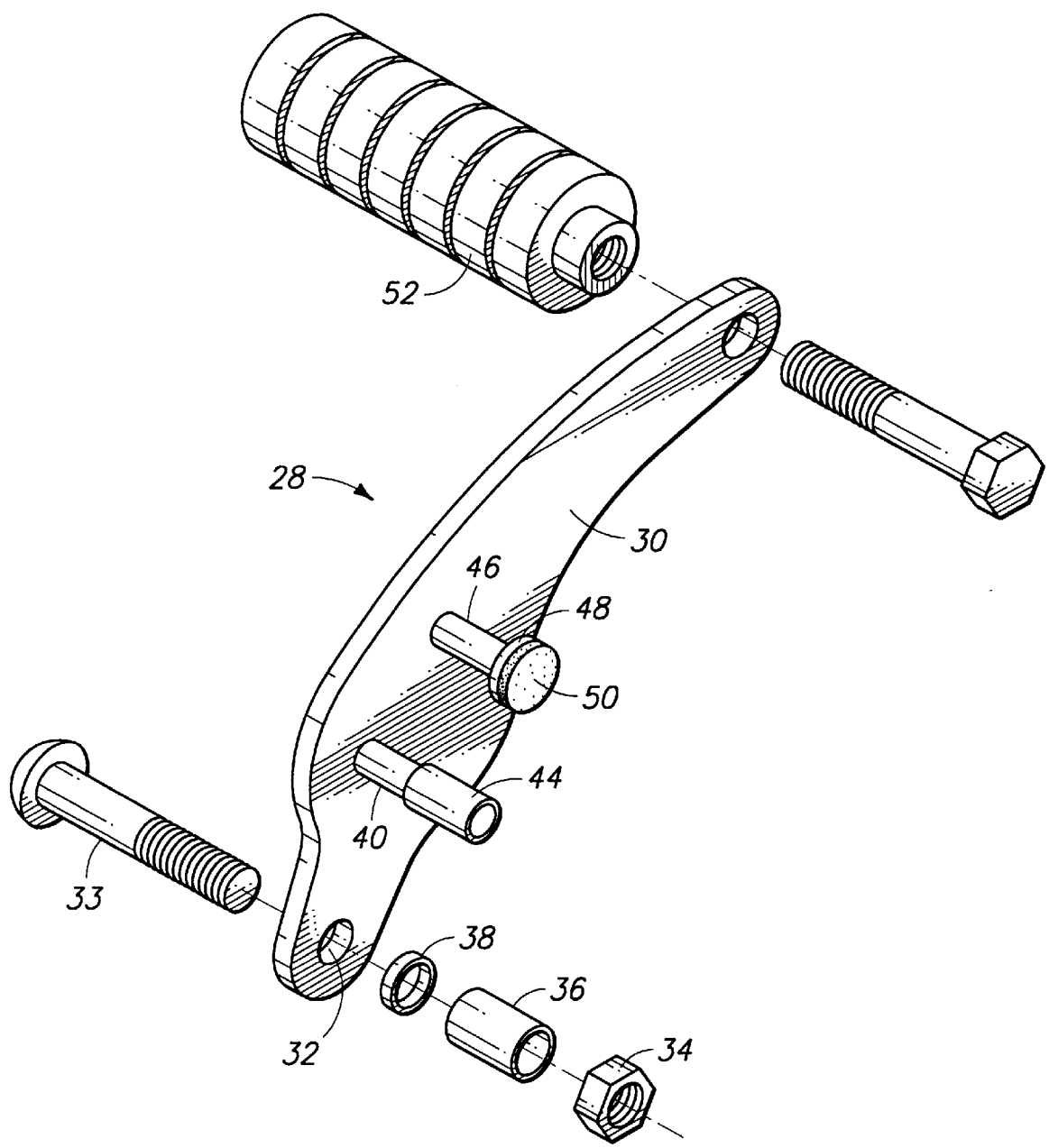

MOTORCYCLE FOOTREST BRACKETS

FIELD OF THE INVENTION

The present invention relates to motorcycle footrest positioning devices.

BACKGROUND OF THE INVENTION

Many present motorcycles are constructed to receive a driver and a passenger. The driver sits astride the motorcycle with both hands grasping the handgrips of the handlebars and both feet resting on foot plates or foot pegs astride the engine. The rider typically sits astride the rear tire directly behind the driver. There is typically no provision for handgrips for the rider and the rider's feet are often situated almost vertically below the rider's seat. This presents a difficult situation when the motorcycle is under way and the driver operates the brakes or otherwise decelerates. The footrest placement leaves the passenger without any support or leverage to push back when slowing down. Thus, the weight of the rider is thrown forward against the back of the driver. This situation can quickly become quite tiring and possibly dangerous for the driver, who must brace against the handlebars to accommodate his or her own torso weight and the rider's torso weight upon deceleration.

A need has therefor existed for a device to facilitate shifting the rider footrest to such a position where the rider is able to apply a rearward force during braking of the motorcycle, thereby counteracting the forward thrusting force and relieving the driver from the necessity to physically restrain the passenger upon deceleration.

BRIEF DESCRIPTION OF THE DRAWINGS

Preferred embodiments of the invention are described below with reference to the following accompanying drawings.

FIG. 2 is a view similar to FIG. 1, only showing the present motorcycle footrest bracket in place and the resultant position of the passenger's leg and foot;

FIG. 3 is a side elevation view of the present footrest bracket for mounting to the left hand side of the motorcycle;

FIG. 4 is a view of a right hand side bracket;

FIG. 5 is an exploded perspective view of a present bracket with mounting hardware and a footrest.

DETAILED DESCRIPTION

Figure 1:
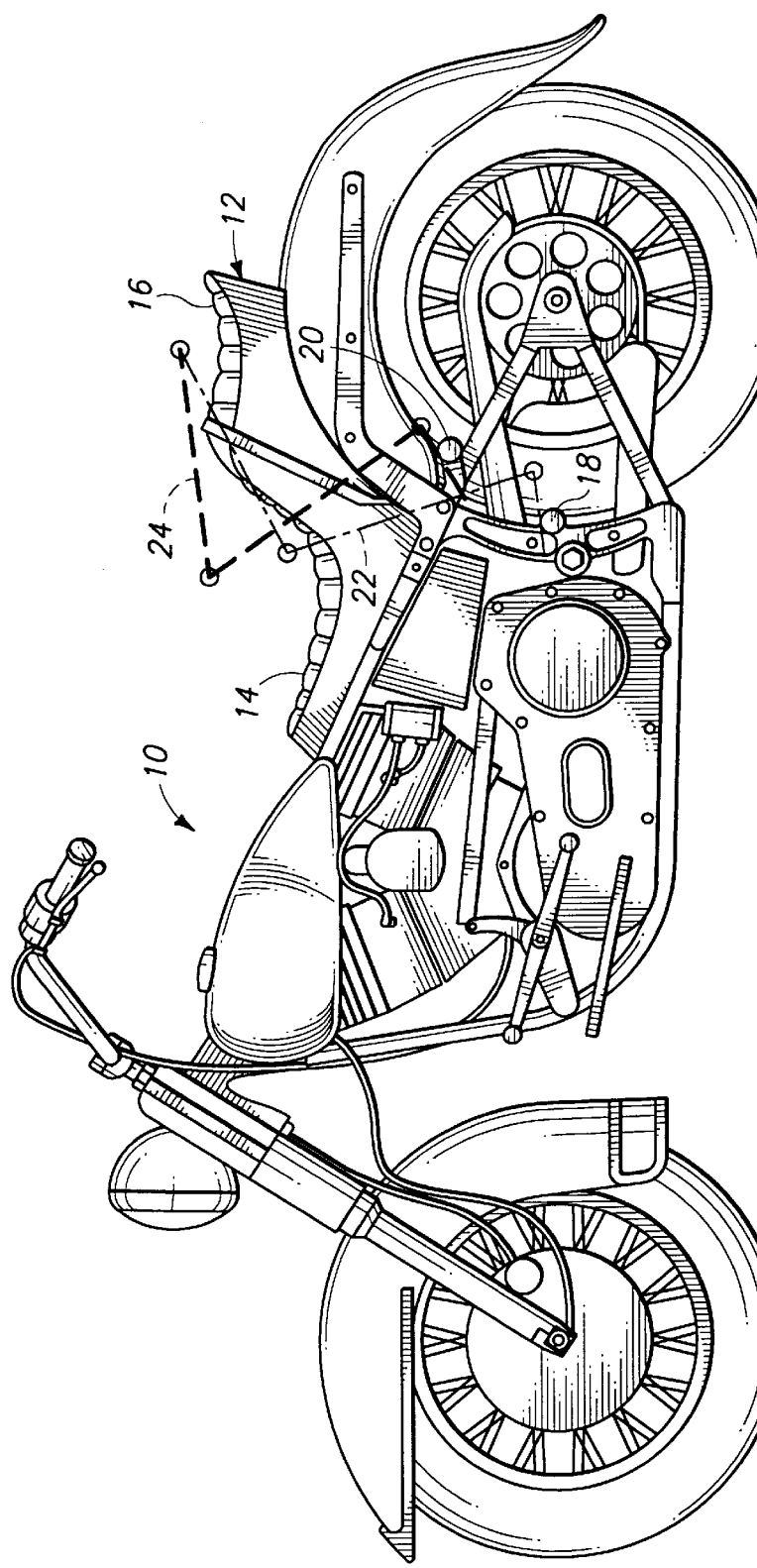
FIG. 1 is a side elevational view demonstrating a prior art motorcycle with passenger leg positions shown in schematic form with respect to existing forms of footrests.

FIG. 1 illustrates a popular form of motorcycle 10 which includes a seat structure 12. The seat structure is elongated and provides a forward driver section 14 and a rearward passenger section 16. FIG. 1 also illustrates a prior footrest position 18 and an alternate footrest position 20. Schematic lines at 22 show a rider's leg and foot position extending from the passenger section to the lower footrest. Another line 24 indicates the rider's leg position for the upper footrest 20. Both of these footrest positions are almost directly under the passenger's seat. This is a difficult position for the passenger to exert sufficient force to move his or her torso backwardly or at least brace against forward thrust when the motorcycle is braking or otherwise decelerating.

The present footrest brackets 28 are provided to be secured on opposite sides of the motorcycle, utilizing the existing mounting holes for the lower footrest 18 and include structure that facilitates secure repositioning of footrests upwardly and forwardly to facilitate a foot and leg position as shown by the schematic line 26 in FIG. 2 of the drawings.

The present brackets 28 each include a rigid base plate 30 that is preferably formed of a strong, rigid material such as steel. Each of the plates includes a bottom end opening 32 that slidably receives a bolt 33 which extends through the opening 32 and threadably engages the motorcycle frame at the same position where the previously provided lower passenger footrest 18 is mounted.

Thus, to mount the present structure, the existing lower footrests are removed from the motorcycle frame and are replaced by the bolts 33, which secure the base plates to the motorcycle frame by appropriate threaded nuts 34. Spacers 36 and washers 38 are provided between the base plates 30 and the motorcycle frame in order to space the plates 30 outwardly of the frame. This is done to provide clearance for the base plates outwardly of adjacent areas of the motorcycle, typically the clutch housing on one side, and the oil reservoir on the other. Adjustments may be made by varying the number of washers 38 used, or by changing the length dimension of the spacers 36 to accommodate motorcycle frame and chassis configurations for different models.

Each of the brackets also includes an inwardly extending pin 40. The pin 40 is preferably securely attached to one side of the base plate as by welding and extends inwardly to an end positioned to rotate into abutment with a portion of the motorcycle frame. This relationship is shown in end view in FIG. 6 where a pin 40 is shown engaging a frame section 42.

Sleeve pads 44 are provided over the inward ends of the pins 40 in order to protect against abrasion between the pins and the motorcycle frame. The pins 40 and sleeve pads 44 prevent forward rotation of the base plates 30 about the axes of the mounting bolts 33 by moving into abutment with adjacent frame structure of the motorcycle as the plates pivot forwardly.

Figure 6:
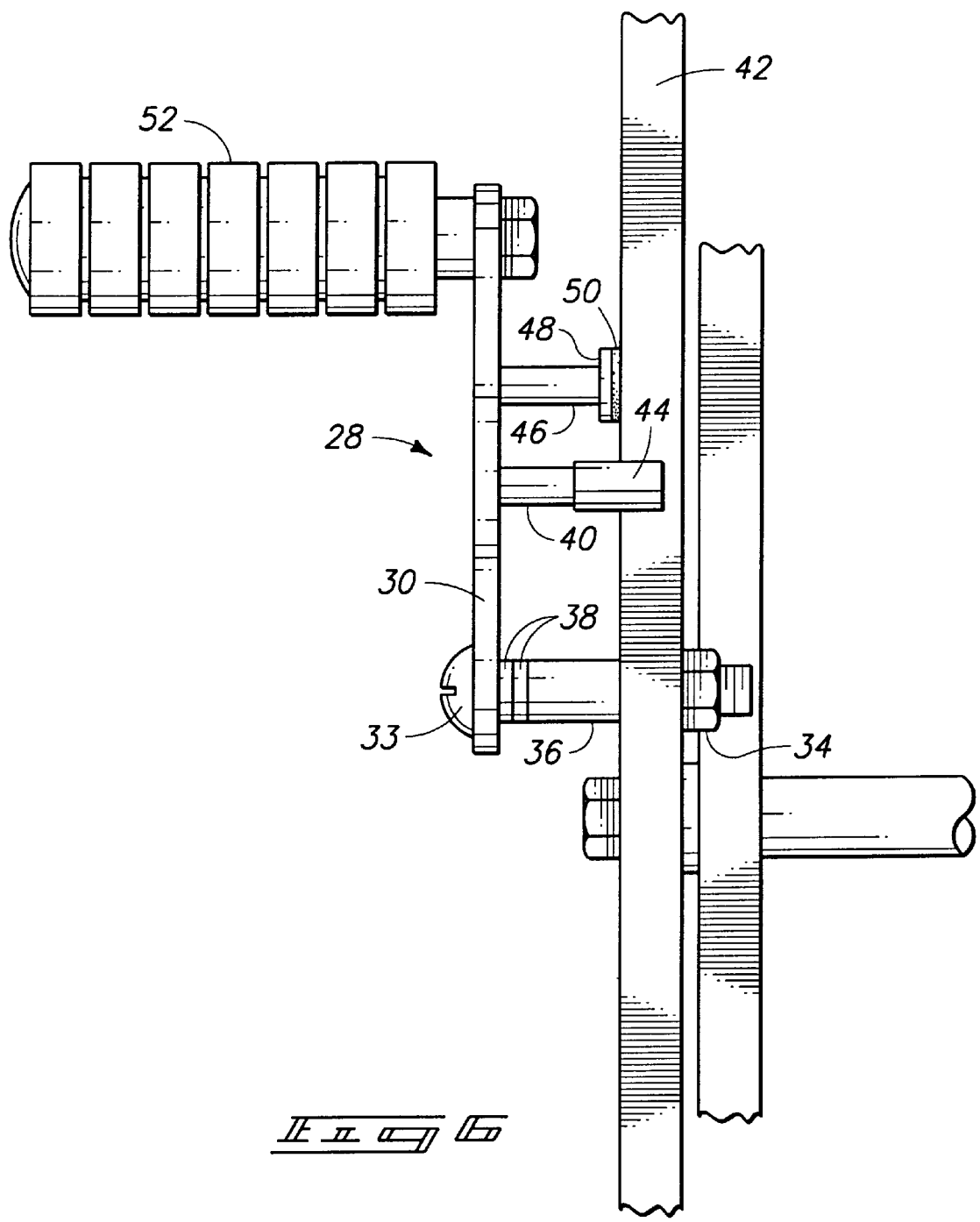
FIG. 6 is a fragmented rear elevation view showing a left side bracket mounted to the frame of a motorcycle.

It is pointed out that FIG. 6 is exemplary of a portion of the motorcycle with the present bracket mounted thereto. The view is taken from behind the motorcycle so, obviously, the left side of the motorcycle frame is shown. The right hand portion would simply be a mirror image of FIG. 6.

Each of the base plates 30 also includes a stud 46 that projects from the one side of the base plate inwardly to a headed end 48. The headed end 48 is flat and is spaced from the plate to engage a side surface of the motorcycle frame substantially as shown in FIG. 6. It is preferred that the stud be secured as by welding to the associated base plate. The stud 46 is situated along the base plate 38 between the pin 40 and a footrest mounting hole at an upper end of the base plate.

The stud head 48 may be provided with a cushion or pad 50, again to prevent abrasion or marring of the motorcycle frame structure. The headed end 48 of the stud is spaced from the plate in order to hold the plate substantially parallel with the motorcycle frame member 42 as shown in FIG. 6 and to prevent torsion of the plate due to forces applied to the footrest 52 by a passenger. The length of the stud, as well as its position, may vary with the model of the motorcycle to which the bracket is to be attached.

The upward ends of the brackets 28 are provided with holes to facilitate mounting of standard footrests 52. The footrests 52 mount by conventional, known fasteners, one of which is shown in exploded view in FIG. 5.

Mounting of the present footrest brackets is a simple matter of first removing the existing lower footrests, or locating the lower footrest openings. Next, the brackets are mounted simply by sliding the mounting bolts 33 through the bottom end openings 32 of the brackets and sliding the appropriate spacers and washers onto the bolt shafts. Now the free ends of the bolts are threaded through the existing lower footrest mounting openings.

If needed, the bolts may be secured by nuts on the opposite side of the motorcycle frame. Before the nuts are tightened, however, the brackets are pivoted to a position where the pins 40 come into rotational abutment with the motorcycle frame. The pins effectively stop forward rotation of the brackets and position the top end of the brackets at the desired location. Now the nuts may be tightened to secure the brackets in position.

If not previously accomplished, footrests may now be added to the bracket by simply attaching them through the appropriate mounting apertures at the top ends of the bracket base plates. The footrests are now repositioned and are ready for use. A passenger on the motorcycle may place his or her feet on the footrests 52. The positions of the footrests are now such that the passenger, when pushing in a down and rearwardly motion, is able to counteract the forward thrusting motion that occurs on deceleration of the motorcycle.

As forces are applied to the footrests 52, the headed studs 46 act against the motorcycle frame, as well as the bolts 33 and spacers 36, to hold the brackets firmly in position against applied torsional forces. Further, the pins 40, engaging rearward surfaces on the motorcycle frame, prevent the brackets from shifting forwardly under forces applied by the passenger.

In compliance with the statute, the invention has been described in language more or less specific as to structural and methodical features. It is to be understood, however, that the invention is not limited to the specific features shown and described, since the means herein disclosed comprise preferred examples of putting the invention into effect.

What is claimed is:

1. Motorcycle footrest brackets to be secured on opposite sides of a motorcycle having a frame and passenger footrest mounting holes on opposed sides of the frame, each of said brackets comprising:
    a rigid base plate including a bottom end and an upward end;
    a bolt mountable to the base plate at the bottom end and configured for attachment to one of the passenger footrest mounting holes on the motorcycle;
    a footrest mount on the rigid base plate adjacent the upward end configured to mount a motorcycle footrest;
    a stud on the base plate projecting therefrom and situated between the bolt and the footrest mount; and
    a pin on the base plate extending to an end and positioned on the base plate and configured to abut with a portion of the motorcycle frame to prevent rotation of the base plate about the bolt.

2. The motorcycle footrest brackets as claimed by claim 1 further comprising a sleeve pad on the pin configured to protect against abrasion between the pin and the frame.

3. The motorcycle footrest brackets as claimed by claim 1 wherein the stud on the base plate projects to a headed end.

4. The motorcycle footrest brackets as claimed by claim 1 wherein the stud projects to a headed end situated between the bolt and the footrest mount, and further comprising a pad on the headed end configured to engage the frame to prevent abrasion of the frame.

5. The motorcycle footrest brackets as claimed by claim 1 further comprising at least one spacer selectively received over the bolt and configured to selectively space the base plate outwardly of the motorcycle frame.

6. The motorcycle footrest brackets as claimed by claim 1 wherein the base plate includes a bottom end opening slidably receiving the bolt.

7. A motorcycle footrest bracket to be secured on a side of a motorcycle having a frame and a passenger footrest mounting hole on the frame, said bracket comprising:
    a rigid base plate including a bottom end and an upward end;
    a bolt mounting hole formed through the base plate adjacent the bottom end;
    a footrest mounting hole formed through the base plate adjacent the upward end;
    a bolt slidably engageable with the base plate through the bolt mounting hole and configured for attachment to the one of the passenger footrest mounting holes on the frame;
    a pin on the base plate extending to an end and positioned on the base plate and configured to abut with a portion of the motorcycle frame to prevent rotation of the base plate about the bolt; and
    a stud on the base plate projecting therefrom to a headed end situated along the base plate between the bolt mounting hole and the passenger footrest mounting hole.

8. The motorcycle footrest bracket as claimed by claim 7 further comprising a footrest mountable to the footrest mounting hole.

9. The motorcycle footrest bracket as claimed by claim 7 further comprising a sleeve pad on the pin configured to engage the motorcycle frame and act as a stop to limit pivotal movement of the base plate on the motorcycle frame.

10. The motorcycle footrest bracket as claimed by claim 7 wherein the headed end of the stud includes a pad configured to engage against the motorcycle frame.

11. The motorcycle footrest bracket as claimed by claim 7 further comprising a selection of spacers configured to be selectively positioned between the base plate and the motorcycle frame in order to space the base plate outwardly of the motorcycle frame.

12. The motorcycle footrest bracket as claimed by claim 7 further comprising a selection of spacers configured to be selectively positioned over the bolt between the base plate and the motorcycle frame in order to selectively space the base plate outwardly of the motorcycle frame.

13. A motorcycle footrest bracket to be secured on a side of a motorcycle having a frame, an elongated seat structure on the frame including a forward driver section and a rearward passenger section, and a passenger footrest mounting hole on the frame, said bracket comprising:
    an elongated rigid base plate including a bottom end and an opposed upward end;
    a bolt mounting hole formed through the base plate adjacent the bottom end;
    a footrest mounting hole formed through the base plate adjacent the upward end;
    a bolt slidably engageable with the base plate through the bolt mounting hole and configured for attachment to one of the passenger footrest mounting holes on the frame;
    a spacer slidably received over the bolt and configured to space the base plate away from the frame by a selected distance;
    a pin located on the base plate between the bolt mounting hole and the footrest mounting hole;

wherein the pin extends from one side of the base plate to an end covered by a sleeve pad;

wherein the pin and sleeve pad are configured to abut with a portion of the motorcycle frame to prevent rotation of the base plate in a forward direction with respect to the rearward passenger section about the bolt;

a stud on the base plate located between the pin and the passenger footrest mounting hole, and projecting from the one side of the base plate to a headed end situated along the base plate between the bolt mounting hole and the passenger footrest mounting hole; and a pad on the headed end of the stud configured to engage against the motorcycle frame.

* * * * *